(12) United States Patent
Mürb

(10) Patent No.: US 9,358,514 B2
(45) Date of Patent: Jun. 7, 2016

(54) GRANULATION DEVICE

(71) Applicant: AUTOMATIK PLASTICS MACHINERY GMBH, Grossostheim (DE)

(72) Inventor: Reinhardt-Karsten Mürb, Aschaffenburg (DE)

(73) Assignee: MAAG AUTOMATIK GMBH, Grossostheim (DE)

( * ) Notice: Subject to any disclaimer, the term of this patent is extended or adjusted under 35 U.S.C. 154(b) by 0 days.

(21) Appl. No.: 14/570,574

(22) Filed: Dec. 15, 2014

(65) Prior Publication Data
US 2015/0099024 A1 Apr. 9, 2015

Related U.S. Application Data

(63) Continuation of application No. PCT/EP2013/001754, filed on Jun. 13, 2013.

(30) Foreign Application Priority Data

Jun. 15, 2012 (DE) .............. 102012012062

(51) Int. Cl.
*B29B 9/06* (2006.01)
*B01J 2/20* (2006.01)
*B29K 101/12* (2006.01)

(52) U.S. Cl.
CPC ... *B01J 2/20* (2013.01); *B29B 9/06* (2013.01); *B29B 9/065* (2013.01); *B29K 2101/12* (2013.01)

(58) Field of Classification Search
CPC .............. B01J 2/20; B29B 9/06; B29B 9/065
See application file for complete search history.

(56) References Cited

U.S. PATENT DOCUMENTS

| 3,427,685 A | 2/1969 | Gove et al. |
| 4,019,414 A | 4/1977 | Thomas, Jr. et al. |
| 2004/0115298 A1* | 6/2004 | Hehenberger et al. ........ 425/311 |
| 2009/0232920 A1* | 9/2009 | Lozano et al. ............... 425/72.2 |
| 2010/0323047 A1 | 12/2010 | Fridley |

FOREIGN PATENT DOCUMENTS

| DE | 10344793 A1 | 4/2005 |
| DE | 202005020467 U1 | 2/2006 |
| DE | 102009019954 A1 | 11/2010 |
| WO | 03031132 A1 | 4/2003 |

\* cited by examiner

*Primary Examiner* — Yogendra Gupta
*Assistant Examiner* — Joseph Leyson
(74) *Attorney, Agent, or Firm* — Buskop Law Group, PC; Wendy Buskop

(57) ABSTRACT

A granulating device for granulating thermoplastic materials. The device has a die head, a cutting chamber housing, and at least one insulating element comprising thermally insulating material. The insulating element is situated between a die head element and a cutting chamber housing element. At least one tempering device situated between the insulating element and cutting chamber housing element or adjacent to the insulating element is provided. The tempering device acts to remove unwanted heat introduced in its vicinity, or to replenish heat undesirably removed from its vicinity.

13 Claims, 5 Drawing Sheets

GRANULATION DEVICE

CROSS REFERENCE TO RELATED APPLICATIONS

The present patent application is a Continuation Application that claims priority to and the benefit of co-pending International Patent Application No. PCT/EP2013/001754 filed Jun. 13, 2013, entitled "GRANULATION DEVICE", which claims priority to DE Application No. 102012012062.1 filed Jun. 15, 2012, entitled "GRANULATOR". These references are incorporated in their entirety herein.

FIELD

The present embodiments generally relate to a device for granulating thermoplastic material or pharmaceutical materials.

BACKGROUND

When granulating thermoplastic material, such as polyethylene or polypropylene, or pharmaceutical materials, granulating devices are often used in which extruded, melted plastic or pharmaceutical material is formed into strands in a die head.

Hot material can be pushed in a molten state through nozzles of a nozzle arrangement of a die head into a cooling fluid such as water or air that is contained in a cutting chamber. In the cutting chamber, there is a blade arrangement with blades that pass over the openings of the nozzle plate to cut the material strands so that pellets are formed.

On the die head side, it is necessary for the melt-conveying parts to be as hot as possible in order to prevent the melt from hardening before the strand formation by the nozzles.

After the strand formation, the melt material in the cutting chamber must be brought to a hardened state as quickly as possible by cooling. On the cutting chamber side, therefore, the housing parts of the cutting chamber must be as cold as possible in order to prevent the granules from adhering to them.

Therefore, there is often a large temperature difference between the parts of the die head and the cutting chamber housing.

At the points in which the parts of the die head and parts of the cutting chamber housing are in contact, the high temperature gradient due to the large temperature difference causes a correspondingly conductive high heat flow from the hot die head, through the contact point, and into the cutting chamber housing.

In order to counteract this undesirable heat flow, insulating materials can be used, which are inserted proximate the contact points to thermally insulate them from each other.

It is known in the art to separate a granulating head from a granulator housing by means of an insulation layer.

Prior art describes describes a granulating device in which a water chamber is connected to a nozzle plate, a seal can be inserted between the water chamber and the nozzle plate to insulate the heated nozzle plate in relation to the water chamber.

In order to minimize the heat flow, ideally insulating materials with the lowest possible heat penetration coefficient b should be used. The heat penetration coefficient b is given as the square root of the product of the thermal conductivity $\lambda$, the density $\rho$, and the specific thermal capacity c of the material:

$$b = \sqrt{\lambda \rho c}$$

When selecting an insulating material, it is necessary to take into account technical requirements of the material such as material sealing, product compatibility, insulating properties, and the mechanical stability and load rating of the contact point.

These different requirements usually cannot all be concurrently optimized, so the selection of insulating material is often a compromise between these different requirements. As a result, in many instances, an insulating material which does not achieve the desired low heat penetration coefficient b is chosen.

This reduces insulating efficacy of the material, and allows for a significant heat input, which can be disruptive and undesirable.

One example of such a process is hot-cut pelletization with air as a process fluid, which is also referred to as air-cooled hot die-face pelletizing.

Based on the low thermal capacity of the process fluid (for example, air), it is not often possible to minimize the above-mentioned heat input to prevent the housing temperature of the cutting chamber from exceeding a beneficial value. There is thus a danger of granules not cooling to solidity in a desired time period, and adhering to the walls of the cutting chamber.

The heat input can also have a disadvantageous effect on the die head since heat is removed from the die head, thus causing it to cool locally at this contact point. This local temperature decrease can in turn result in undesirable temperature distribution in the die head.

This can also occur in underwater granulation, in which the process fluid (for example, water), due to its high thermal capacity, produces a relatively high heat dissipation. The water effectively carries off a heat flow traveling into the cutting chamber housing, which in turn results in more heat removed from the die head and intensifying local cooling of the die head at the contact point.

The object of the present invention, therefore, is to disclose a granulating device that overcomes the above-mentioned disadvantages.

Another object of the invention is to disclose a granulating device in which heat transfer between the cutting chamber housing and the die head is effectively prevented or reduced.

These and other objects of the present invention are attained by the present embodiments.

BRIEF DESCRIPTION OF THE DRAWINGS

The detailed description will be better understood in conjunction with the accompanying drawings as follows.

Figure 1A:
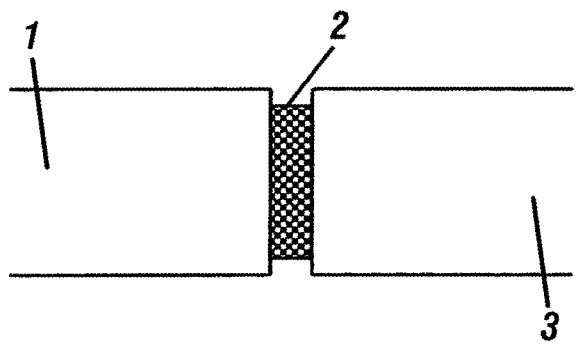
FIG. 1A shows a contact point between a die head and a cutting chamber housing with the assumption of ideal conditions.

The present embodiments are detailed below with reference to the listed Figure.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present invention relates to a device for granulating thermoplastic materials. The device can have a die head, a cutting chamber housing, and at least one insulating element comprising thermally insulating material, which is situated between a die head element and a cutting chamber housing element. A tempering device can be provided, which can be located between the insulating element and cutting chamber housing element or in the cutting chamber housing element in a region adjacent to the insulating element.

The tempering device can function as a cooling unit or a heating unit.

By placing a tempering device in the form of a cooling unit directly at or in the immediate vicinity of an insulating element, heat can be absorbed and dissipated from the die head at the entry point, thereby maintaining the cutting chamber housing at a cooled temperature.

As a result, the passive insulating action of an insulating is aided by an active action of the cooling unit which absorbs and removes the excess heat. In the reverse manner, a tempering device in the form of a heating unit can counteract a discharge of heat and thus prevent cooling.

A tempering device can have one or more conduits, which are provided to allow a tempered heat transfer fluid to flow. The heat transfer fluid can be water, a heat transfer oil, air, a gas, or other appropriate fluid. The at least one tempering device can have an electrical Peltier element in addition to, or in place of the conduits.

The cutting chamber housing element can be a connecting flange section of the cutting chamber housing. The insulating element can, for example, be a ring comprising insulating material. The insulating element can, for example, be placed on an annular surface of the connecting flange section in order to thermally insulate the connecting flange section in relation to an annular gap that is present between the connecting flange section and a die head unit.

The die head can have a nozzle plate, a unit for supplying melt material to the nozzle plate and means of fastening the nozzle plate to the unit, such as a snap ring. The snap ring can be situated in the annular gap.

The connecting flange section can be fastened to a flange of the unit.

Alternatively or in addition, the insulating element can be situated between the connecting flange section and the flange of the unit.

The tempering device in the connecting flange section can be at least an annular conduit or an annular groove, which can be adjacent to one side of the insulating element.

The tempering device can be a cooling unit in order to absorb and dissipate thermal energy that is introduced into the cutting chamber housing element as a result of a heat flow through the insulating element. In this embodiment, heating of the cutting chamber housing element due to introduced heat is prevented or reduced. The cooling unit can be controlled so that a setpoint temperature is maintained in the cutting chamber housing element.

The granulating device can use an air-cooled hot die-face pelletizing method or an underwater granulation method.

The granulating device can be used to granulate a pharmaceutical material.

Turning now to the Figures, FIG. 1A shows a contact point between a die head and a cutting chamber housing with the assumption of ideal conditions.

FIG. 1A schematically depicts an element of a die head 1, which contacts an element of a cutting chamber housing 3 via an insulating element 2. As explained above, a high temperature should prevail in the die head 1, which is referred to as the setpoint temperature of the die head $T_{D\_setpoint}$. The cutting chamber housing 3, by contrast, should be as cold as possible. Correspondingly, a significantly lower temperature of the cutting chamber housing, $T_{C\_setpoint}$, should prevail in the cutting chamber housing 3.

Under ideal (theoretical) conditions, the insulating element 2 thermally separates the die head 1 and the cutting chamber housing 3 from each other so that no heat flow occurs. These ideal conditions, which correspond to an ideal insulating element 2 with a heat penetration coefficient b of 0, would yield a temperature evolution as shown in FIG. 1B.

Figure 1C:
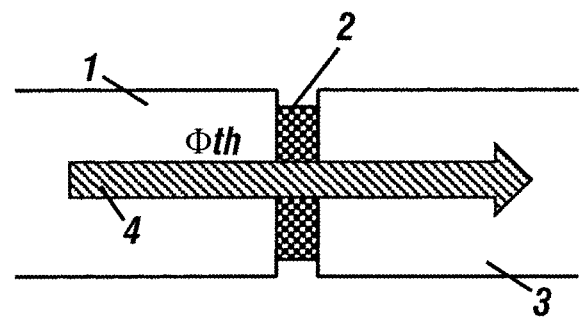
FIG. 1C shows a contact point between a die head and a cutting chamber housing.
Figure 1B:
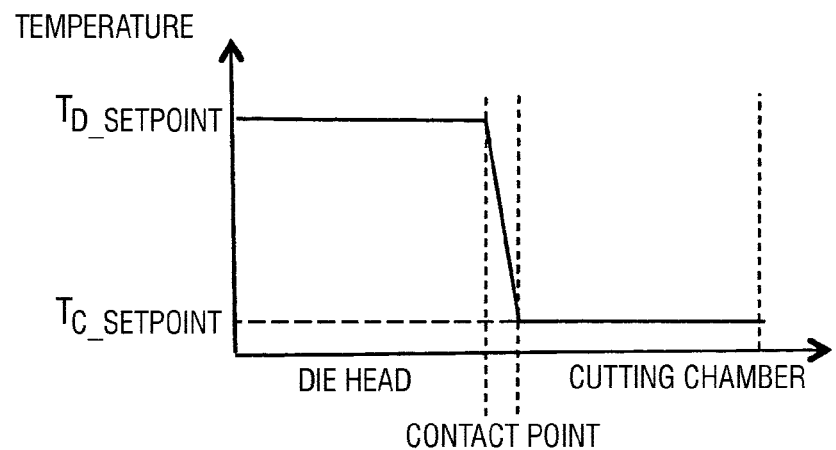
FIG. 1B shows a temperature evolution for the contact point in FIG. 1A.

FIG. 1B shows a temperature evolution for the contact point in FIG. 1A.

All the way to the insulator 2, the die head 1 would have a uniform, unchanging hot setpoint temperature $T_{D\_setpoint}$ while the cutting chamber housing 3 would have a uniform, unchanging cold setpoint temperature $T_{C\_setpoint}$. A temperature change would be limited solely to the region of the insulating element 2.

This ideal cannot be practically achieved achieved in many cases, and a remaining heat input continues to occur.

Figure 1D:
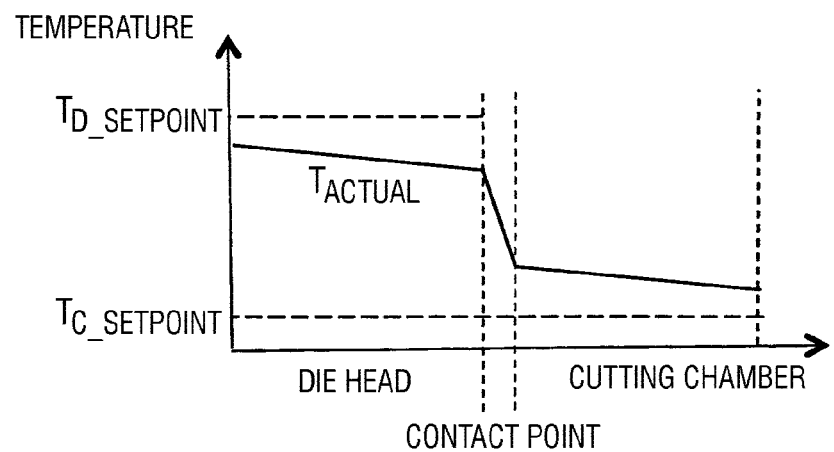
FIG. 1D shows a temperature evolution for the contact point in FIG. 1C.

FIG. 1C shows a contact point between a die head and a cutting chamber housing and FIG. 1D shows a temperature evolution for the contact point in FIG. 1C.

A schematic heat flow $\Phi_{th}$ 4 is shown between a die head and a cutting chamber housing. This heat flow $\Phi_{th}$ 4 results because heat is removed from the die head 1 and the die head cools increasingly proximal to the contact point. The die head setpoint temperature $T_{D\_setpoint}$ is exceeded. In the cutting chamber housing 3, the heat input produces the reverse situation: The cutting chamber housing 3 is locally heated and the cutting chamber housing setpoint temperature $T_{C\_setpoint}$ is exceeded.

Figure 2A:
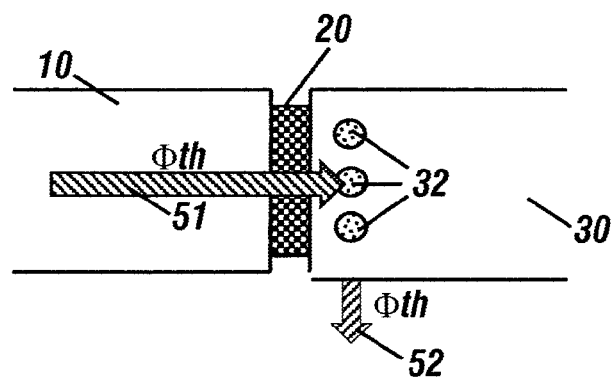
FIG. 2A shows a contact point between a die head and a cutting chamber housing according to a first embodiment.
Figure 2B:
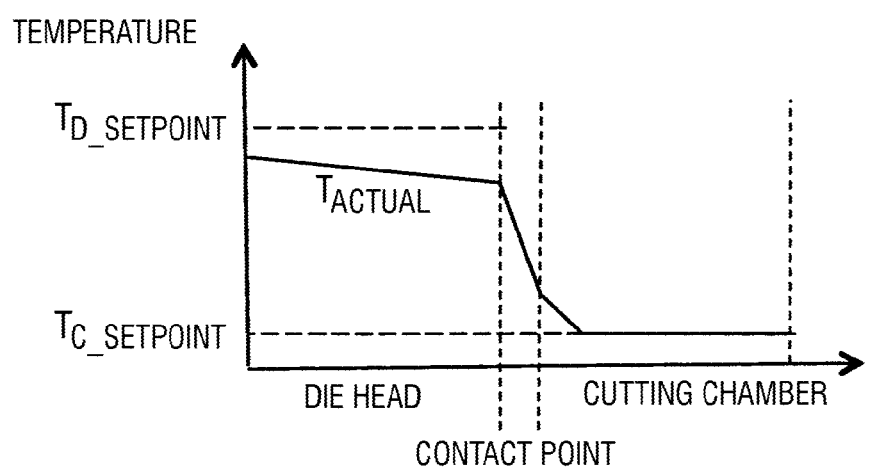
FIG. 2B shows a temperature evolution for the contact point in FIG. 2A.

FIG. 2A shows a contact point between a die head and a cutting chamber housing according to a first embodiment and FIG. 2B shows a temperature evolution for the contact point in FIG. 2A.

Shown here is a schematic depiction of an element of a die head 10 that contacts an element of a cutting chamber housing 30 via an insulating element 20.

The respective elements can, for example, be circumferential, circular fastening flanges by means of which the cutting chamber housing and the die head are mechanically fastened to each other. The die head can also be a nozzle plate, a snap ring for the nozzle plate, another component of the die head, and the like. Likewise, the cutting chamber housing can be other components such as a cutting chamber wall.

In this connection, a point at which an element of the die head is in communication with an element of the cutting chamber housing, whether through a direct contact or through an insulating material, is referred to as a contact point.

At the contact point of the embodiment shown in FIG. 2A, the cutting chamber 30 is provided with a tempering device 32 which can be one or more conduits 32 for a tempered heat transfer fluid. Water, heat transfer oil, a gas, and the like can be used for the heat transfer fluid. The conduits 32 can be situated in the cutting chamber element 30 in a region adjacent to the insulating element 20. The tempering device composed of the conduits 32 can be used as a cooling unit. The heat transfer fluid can be tempered to a low temperature, such as the setpoint temperature $T_{C\_setpoint}$ of the cutting chamber housing 30.

In this manner, the tempering device 32 can serve as a heat sink for the excess heat that the heat flow 51 from the die head 10 introduces into the cutting chamber housing 30 via the insulating element 20, which does not provide ideal thermal insulation.

The excess heat is absorbed and dissipated outward by the heat transfer fluid in the conduits 32, as indicated by the heat flow arrow 52. The excess heat therefore cannot penetrate via the conduits 32 into the cutting chamber housing 30. The section of the cutting chamber housing 30 situated after the conduits 32 does not experience any heat input and, as a result, no heating beyond the setpoint temperature occurs in this section. This yields the temperature evolution schematically depicted in FIG. 2B.

Figure 3A:
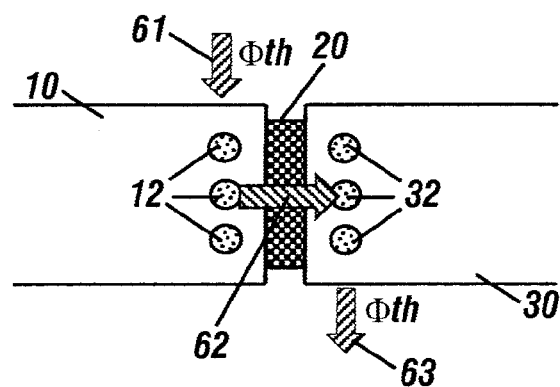
FIG. 3A shows a contact point between a die head and a cutting chamber housing according to a second embodiment.
Figure 3B:
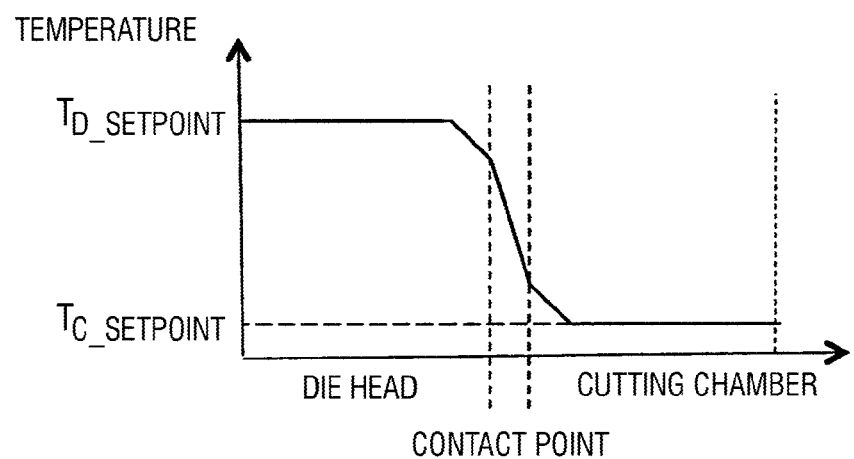
FIG. 3B shows a temperature evolution for the contact point in FIG. 3A.

FIG. 3A shows a contact point between a die head and a cutting chamber housing according to a second embodiment and FIG. 3B shows a temperature evolution for the contact point in FIG. 3A.

In another embodiment, as shown in FIG. 3A, a tempering device 12 can also be embodied on the die head side. The tempering device 12 can likewise be in the form of one or more conduits 32 in the vicinity of the insulating element 20 for a tempered heat transfer fluid.

The tempering device 12 here can be embodied in the form of a heating unit. The heat transfer fluid can be tempered to a high temperature, such as the setpoint temperature $T_{D\_setpoint}$ of the die head. The tempering device 12 can serve as a source for heat that is introduced into the die head element 10, as shown by the heat flow 61. The heat flow 61 can introduce a quantity of heat substantially equivalent to the heat introduced into the cutting chamber element 30 as the heat flow 62.

The heat flow 61 therefore replenishes the die head element 10 with the heat quantity that is removed from it through the insulating element 20 due to the heat flow 62. Therefore, there is no discharge of heat from the die head element 10 so that no local cooling of the die head element 10 occurs. This is schematically depicted in the temperature evolution in FIG. 3B.

As demonstrated by the temperature evolution shown in FIG. 3B, the use of two tempering devices—one tempering device in the die head element 10 and the other tempering device in the cutter head housing element 30, each in a respective region adjoining or adjacent to the insulating element 20—can achieve a good approximation of the idealized temperature evolution shown in FIG. 1B.

Figure 4:
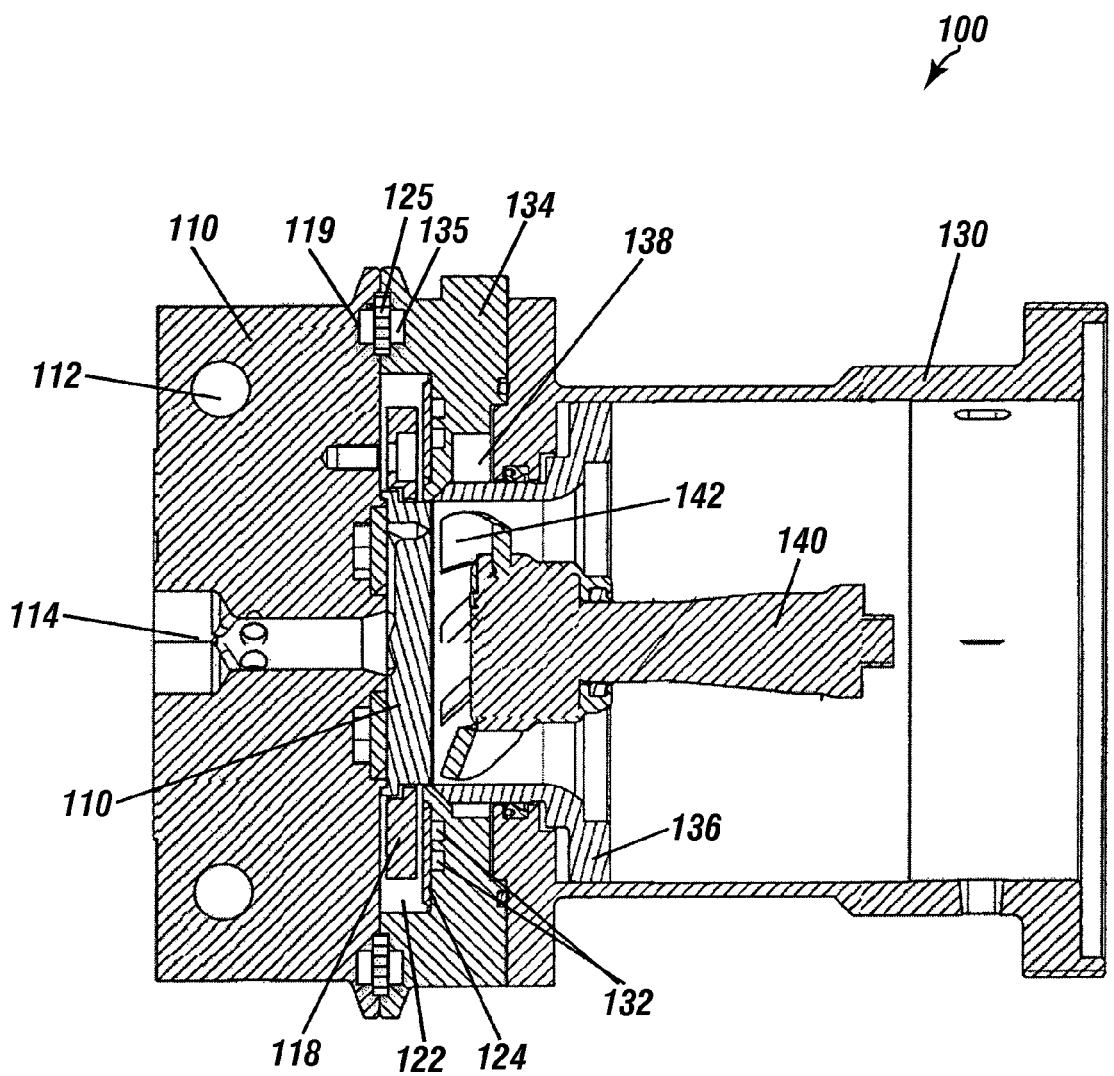
FIG. 4 shows an embodiment of a granulating device according to the invention.

FIG. 4 shows an embodiment of a granulating device according to the invention.

The granulating device 100 can, for example, be a granulating device that functions according to the air-cooled hot die-face pelletizing principle, such as for granulating pharmaceutical materials.

The granulating device 100 can have a die head with a nozzle plate 116 and a unit 110 situated upstream of the nozzle plate 116 in the flow direction. In the unit 110, a passage 114 is provided for conveying melt material to the nozzle plate 116. The unit 110 can be a tensile anchor plate, a melt distributor, a connecting plate, or another unit, as are known to persons having ordinary skill in the art for conveying melt material to a nozzle plate of a granulating device.

In the unit 110, a heating unit can be provided, such as an annular conduit 112 for a fluid convection heating. Alternatively, it is also possible to provide an electrical heating element, which is situated in or on the unit 110. The heating unit can serve to heat the unit 110 and the nozzle plate 116 to a temperature $T_{D\_setpoint}$ that keeps the melt material in the required molten state.

The device can also have a cutting chamber, comprising a cutter head 140 with at least one cutter 142. The cutter, during operation, can pass over the nozzle openings embodied in the nozzle plate 116 in order to cut the material strands emerging through the openings so that pellets are formed.

The cutting chamber is defined by a cutting chamber housing. The cutting chamber housing can be embodied of one piece or of multiple pieces. In the embodiment shown in FIG. 4, the cutting chamber housing is composed of a cutting chamber main housing 130 and a connecting flange section 134. The connecting flange section 134 in this embodiment serves to mechanically fasten the cutting chamber housing to a corresponding flange surface of the unit 110.

In the cutting chamber, a gap sleeve 136 can be provided. The gap sleeve 136 can be offset in order to leave a path through which a process fluid can travel from a process fluid conduit 138 into the cutting chamber.

The nozzle plate 116 can be fastened to the unit 110, such as by means of a snap ring 118. The snap ring 118 in this case can be situated inside an annular gap 122, which is situated between the unit 110 and the connecting flange section 134.

An annular insulating element 124 composed of thermally insulating material can be situated on the connecting flange section 134 in order to thermally insulate at least a part of the surface of the connecting flange section 134 oriented toward the gap 122 from the heat contained in gap 122, which can be introduced by the hot unit 110 and/or the nozzle plate 116.

In the connecting flange section 134, there can be two groove-like annular conduits 132, which adjoin the insulating element 124. The groove-shaped conduits 132 are used to convey a heat transfer fluid and function as a tempering device. In particular, the conduits 132 can be used as a cooling unit in order to absorb and dissipate the thermal energy that travels through the insulating element 124 so as to prevent a heating of the connecting flange section.

Alternatively or in addition, an insulating element 125 can be inserted between the flanges of the connecting flange section 134 and the unit 110. Adjacent to the insulating element 125, it is possible to provide annular, groove-shaped conduits 119 and 135 in the unit 110 and connecting flange section 134, respectively. The conduit 119 in this case can function as a heating unit and can serve as a source of heat while the conduit 135 can function as a cooling unit and serve as a heat sink.

In this way, the annular conduits 132 and 135 are used individually or in conjunction so that thermal energy due to the temperature gradient between the nozzle head and the cutting chamber housing conveyed away. The connecting flange section 134 can thereby be prevented from undesirably heating and effectively kept at a desired setpoint temperature $T_{C\_setpoint}$.

With the prevention of an undesirable heating of the connecting flange section 134, it is also possible to prevent the connecting flange section 134 from in turn undesirably heating the process fluid being conveyed in process fluid conduit 138.

Whereas the tempering devices have been described above in the form of heat transfer fluid conveying conduits, it is also possible to use other embodiments for removal or addition of heat.

For example, tempering devices can be electrical Peltier elements, whose one side contacts the insulating element and whose other side contacts a surface of the die head element or of the cutting chamber element. The Peltier elements can be operated so that the one side is heated and the other side is cooled in order to thus produce a heat flow through the Peltier element, which is oriented in the opposite direction from the heat flow through the insulating element.

For tempering devices that are to serve as heat sources, it is also possible to use electrical heating elements such as resistance heating units, heater coils, or the like.

While these embodiments have been described with emphasis on the embodiments, it should be understood that within the scope of the appended claims, the embodiments might be practiced other than as specifically described herein.

What is claimed is:

1. A device for granulating thermoplastic materials, comprising:
   a. a die head;
   b. a cutting chamber housing;
   c. at least one insulating element comprising a thermally insulating material, wherein the at least one insulating element is situated between a die head element and a cutting chamber housing element; and
   d. at least one tempering device situated proximately to the at least one insulating element, wherein the at least one tempering device is a cooling unit in order to absorb and dissipate thermal energy that is introduced into the cutting chamber housing element as a result of a heat flow through the at least one insulating element.

2. The device for granulating thermoplastic materials of claim 1, wherein the at least one tempering device has one or more conduits for allowing a tempered heat transfer fluid to flow through.

3. The device for granulating thermoplastic materials of claim 2, wherein the tempered heat transfer fluid is: water, a heat transfer oil, air, or a gas.

4. The device for granulating thermoplastic materials of claim 1, wherein the at least one tempering device comprises at least one electrical Peltier element.

5. The device for granulating thermoplastic materials of claim 1, wherein the cutting chamber housing element is a connecting flange section of the cutting chamber housing.

6. The device for granulating thermoplastic materials of claim 5, wherein the at least one insulating element is a ring comprising insulating material on an annular surface of the connecting flange section in order to thermally insulate the connecting flange section from an annular gap between the connecting flange section and the die head element.

7. The device for granulating thermoplastic materials of claim 1, wherein the die head comprises: a nozzle plate, a unit for conveying melt material to the nozzle plate, and a snap ring in the annular gap to fasten the nozzle plate to the unit.

8. The device for granulating thermoplastic materials of claim 5, wherein the connecting flange section is fastened to a flange of a unit.

9. The device for granulating thermoplastic materials of claim 8, wherein the at least one insulating element is between the connecting flange section and the flange of the unit.

10. The device for granulating thermoplastic materials of claim 5, wherein the at least one tempering device is in the connecting flange section and is at least one annular conduit or groove adjacent to one side of the at least one insulating element.

11. The device for granulating thermoplastic materials of claim 1, wherein the cooling unit can in particular be controlled so that a setpoint temperature ($T_C$_setpoint) is maintained in the cutting chamber housing element.

12. The device for granulating thermoplastic materials of claim 1, wherein the device for granulating thermoplastic materials is adapted to be air cooled while creating pellets with a hot die face.

13. The device for granulating thermoplastic materials of claim 1, device for granulating thermoplastic materials is adapted for use underwater.

* * * * *